United States Patent
Lai et al.

(10) Patent No.: US 9,268,728 B2
(45) Date of Patent: Feb. 23, 2016

(54) PORTABLE ELECTRONIC DEVICE AND ACCESSORY DEVICE THEREOF, AND OPERATING METHOD FOR THE PORTABLE ELECTRONIC DEVICE

(75) Inventors: Yu-Peng Lai, Taoyuan County (TW); Wei-Chih Chang, Taoyuan County (TW); Ching-Chung Hung, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 633 days.

(21) Appl. No.: 13/540,085

(22) Filed: Jul. 2, 2012

(65) Prior Publication Data

US 2014/0006678 A1   Jan. 2, 2014

(51) Int. Cl.
*G06F 13/14* (2006.01)
*G06F 13/38* (2006.01)
*H04M 1/21* (2006.01)

(52) U.S. Cl.
CPC .............. *G06F 13/385* (2013.01); *H04M 1/21* (2013.01)

(58) Field of Classification Search
CPC ............................... G06F 13/385; H04M 1/21
USPC .................................................. 710/305, 316
See application file for complete search history.

(56) References Cited

U.S. PATENT DOCUMENTS

| | | | |
|---|---|---|---|
| 5,948,077 A | 9/1999 | Choi et al. | |
| 6,981,080 B2 | 12/2005 | Thompson et al. | |
| 2005/0268000 A1 | 12/2005 | Carlson | |
| 2008/0140887 A1* | 6/2008 | Gallant et al. | 710/100 |
| 2009/0198841 A1 | 8/2009 | Yoshida et al. | |
| 2010/0062759 A1* | 3/2010 | Sinton et al. | 455/426.1 |
| 2010/0169534 A1 | 7/2010 | Saarinen et al. | |
| 2011/0099300 A1 | 4/2011 | Siulinski | |
| 2012/0110235 A1* | 5/2012 | Hsieh et al. | 710/316 |
| 2012/0198101 A1* | 8/2012 | Porcella et al. | 710/12 |
| 2013/0322010 A1* | 12/2013 | Hung et al. | 361/679.41 |

FOREIGN PATENT DOCUMENTS

| | | |
|---|---|---|
| CN | 101543123 A | 9/2009 |
| CN | 102054370 A | 5/2011 |
| EP | 2315335 | 4/2011 |
| WO | WO 2008/068311 | 6/2008 |
| WO | WO 2009/045678 | 4/2009 |

OTHER PUBLICATIONS

DE Office Action with an English brief summary. pp. 1-8.
Chinese Office Action and Search Report dated Sep. 28, 2015 for Application No. 201210322208.6.

* cited by examiner

*Primary Examiner* — Nimesh G Patel
(74) *Attorney, Agent, or Firm* — Birch, Stewart, Kolasch & Birch, LLP

(57) ABSTRACT

A portable electronic device and an accessory device thereof, and an operating method for a portable electronic device. According to the disclosure, an accessory device coupled at a universal serial bus connector of a portable electronic device is detected and identified via the identification pin of the universal serial bus connector. When it is identified that the accessory device supports 1-wire communication via the identification pin, the accessory device is accessed via the 1-wire communication via the identification pin.

9 Claims, 7 Drawing Sheets

PORTABLE ELECTRONIC DEVICE AND ACCESSORY DEVICE THEREOF, AND OPERATING METHOD FOR THE PORTABLE ELECTRONIC DEVICE

BACKGROUND OF THE INVENTION

1. Field of the Invention

The present invention relates to a portable electronic device, an accessory device for the portable electronic device, and an operating method for a portable electronic device.

2. Description of the Related Art

Various accessory devices have been developed due to the increasingly powerful computing capabilities of portable electronic devices, such as a smart phones.

Therefore, it is an important issue to correctly detect and identify an accessory device coupled to the portable electronic device and to communicate with the accessory device.

BRIEF SUMMARY OF THE INVENTION

A portable electronic device and an accessory device thereof and an operating method for a portable electronic device are disclosed.

A portable electronic device in accordance with an exemplary embodiment of the invention comprises a device body, a universal serial bus connector, a processing unit and a switch. The universal serial bus connector is equipped on the device body for insertion of an accessory device to electronically connect the accessory device to the portable electronic device. The switch, controlled by the processing unit, selectively couples an identification pin of the universal serial bus connector to different receiving terminals of the processing unit for different functions, and thereby the processing unit detects and identifies the accessory device via the identification pin of the universal serial bus connector and, when the accessory device supports 1-wire communication via the identification pin, the processing unit communicates with the accessory device via the 1-wire communication.

An accessory device in accordance with an exemplary embodiment of the invention is capable of communicating with a portable electronic device through 1-wire communication. The accessory device comprises a memory unit and a universal serial bus connector. The memory unit is stored with operation parameters for the portable electronic device. The universal serial bus connector is for connecting to the portable electronic device. Via the identification pin of the universal serial bus connector, the portable electronic device detects and identifies the accessory device, and, after the accessory device is identified by the portable electronic device, the portable electronic device communicates with the accessory device via the identification pin in accordance with the 1-wire communication.

In accordance with another exemplary embodiment of the invention, an operating method for a portable electronic device comprises the following steps: using an identification pin of an universal serial bus connector to detect and identify an accessory device which the universal serial bus connector is connected to; and, when it is identified that the accessory device supports 1-wire communication via the identification pin, communicating with the accessory device Via the 1-wire communication via the identification pin.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
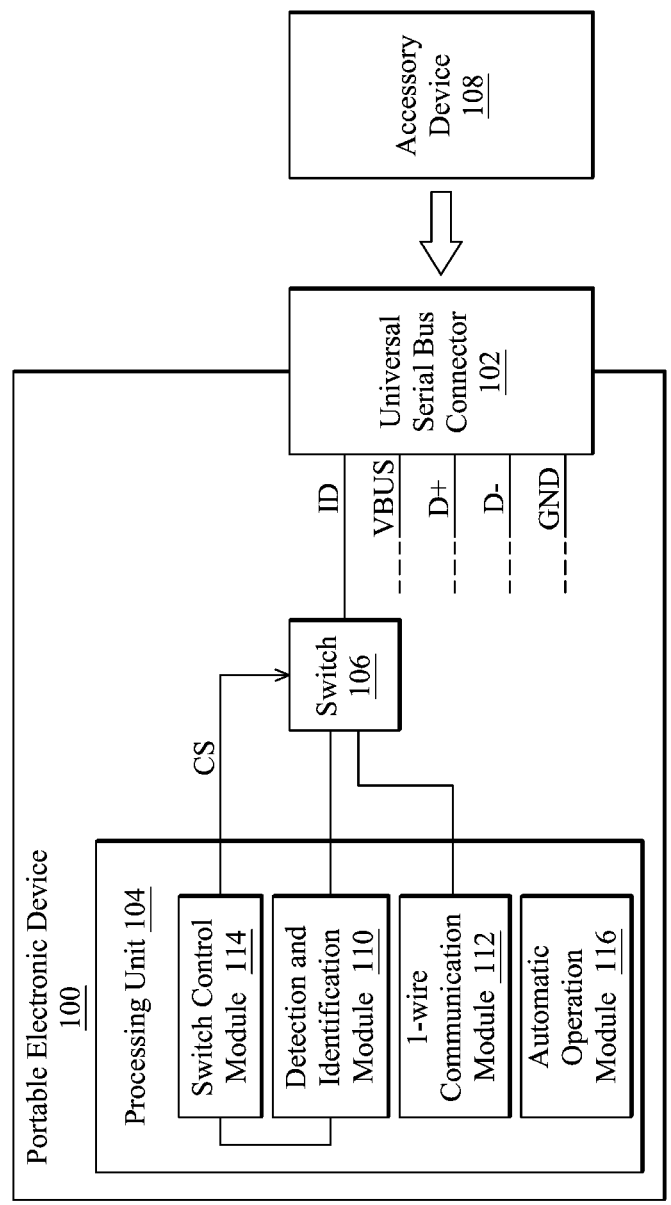
FIG. 1 depicts a portable electronic device 100 in accordance with an exemplary embodiment of the invention.

FIG. 1 depicts a portable electronic device 100 in accordance with an exemplary embodiment of the invention. The portable electronic device 100 comprises a universal serial bus connector (USB connector) 102 (as shown, assembled on the device body of the device 100,) a processing unit 104 and a switch 106.

The universal serial bus connector 102 is used to electrically connect to an accessory device 108. The universal serial bus connector 102 may be implemented by a mini USB or Micro USB, generally having five pins which are generally symbolized by an ID (corresponding to an identification pin), VBUS, D+, D− and GND.

The processing unit 104 comprises a detection and identification module 110, a 1-wire communication module 112, a switch control module 114, and an automatic operation module 116. Via the identification pin ID of the universal serial bus connector 102, the detection and identification module 110 detects an electrical connection between the accessory device 108 and the portable electronic device 100 and identifies the accessory device 108. Via the 1-wire communication module 112, 1-wire communication to the accessory device 108 via the identification pin ID is implemented. The switch control module 114 outputs a switch control signal CS. According to the switch control signal CS, the switch 106 is preset to a first state to couple the identification pin ID to the detection and identification module 110. According to the identification, provided by the detection and identification module 110, of the accessory device 108, the switch control module 114 switches the switch control signal CS to a second state. In the second state, the switch 106 couples the identification ID to the 1-wire communication module 112.

According to an exemplary embodiment of the invention, the switch control module 114 sets the switch control signal CS to switch the switch 106 to the second state, when it is determined by the detection and identification module 110 that the accessory device 108 supports the 1-wire communication, via the identification pin ID. In this manner, the 1-wire communication module 112 reads a memory unit (e.g. EEPROM) within the accessory device 108 via the 1-wire communication. According to the information that the 1-wire communication module 112 reads out from the memory unit of the accessory device 108, the automatic operation module 116 of the processing unit 104 may automatically operate the portable electronic device 100 to have it enter a specific mode.

Figure 2A:
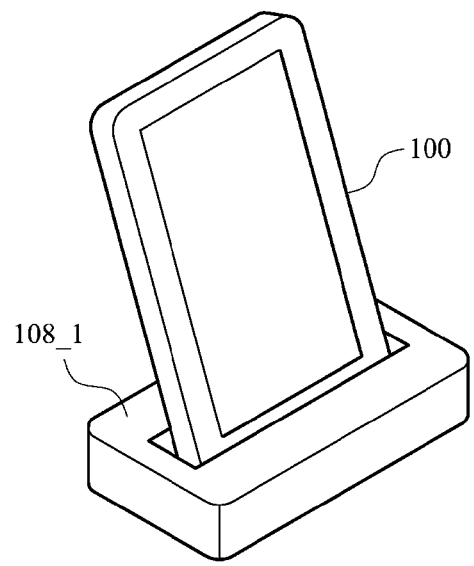
FIG. 2A and FIG. 2B show applications of the portable electronic device 100 and the accessory device 108 when the portable electronic device 100 is a smart phone.
Figure 2B:
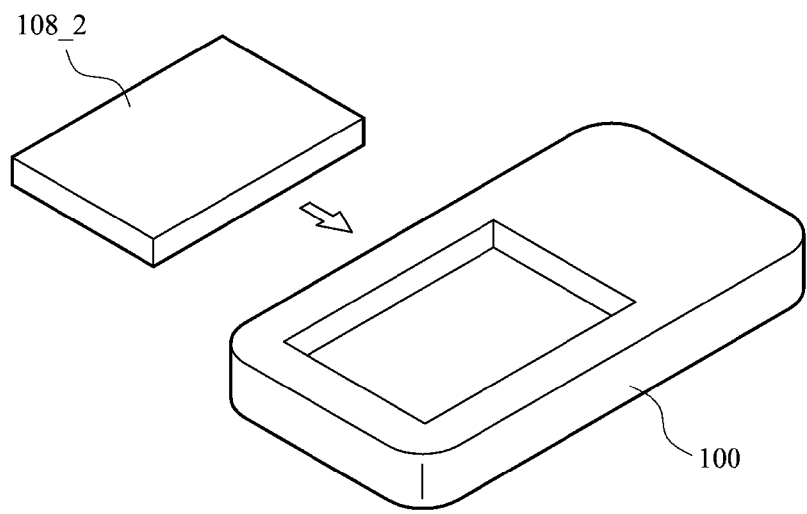

FIG. 2A and FIG. 2B show applications of the portable electronic device 100 and the accessory device 108 when the portable electronic device 100 is a smart phone.

Referring to the example shown in FIG. 2A, the accessory device 108_1 is a cell phone cradle. The cell phone cradle 108_1 may include a memory unit (e.g. a EEPROM), which is stored with a set of operation parameters about the smart phone 100. In an exemplary embodiment, a set of operational parameters may be provided to switch the smart phone 100 to a music player mode (or another special mode) once the smart phone 100 is assembled onto the cell phone cradle.

In the example shown in FIG. 2B, the accessory device 108_2 is a cell phone battery. The cell phone battery 108_2 may include a memory unit (e.g. a EEPROM) which is stored with a set of operation parameters about the smart phone 100. In an exemplary embodiment, the set of operation parameters may form a password. Only the cell phone battery with a correct password can normally power the smart phone 100.

In other exemplary embodiments, the 1-wire communication performed via the 1-wire communication module 112 is further used to amend the information stored in the memory unit of the accessory device 108. Referring to the exemplary embodiment of FIG. 2A, a user may operate the smart phone 100 to amend the set of operation parameters stored in the memory unit of the cell phone cradle 108_1. In an exemplary embodiment, by amending the set of operation parameters, the smart phone 100 may operate as a navigation machine when the smart phone 100 is assembled onto the cell-phone cradle 108_1.

Figure 3A:
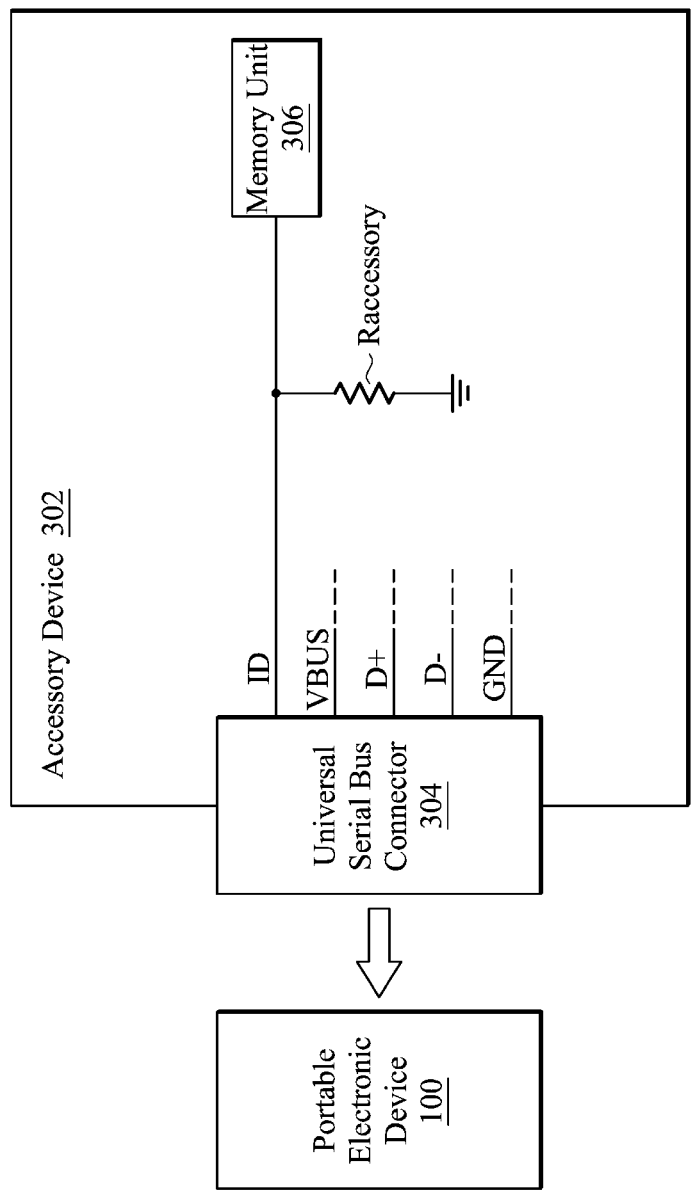
FIG. 3A depicts an accessory device 302 which communicates with a portable electronic device by 1-wire communication Via the identification pin of an universal serial bus connector.

FIG. 3A depicts an accessory device in accordance with an exemplary embodiment of the invention, which supports 1-wire communication via the identification pin ID of a universal serial bus connector. The accessory device 302 may include a universal serial bus connector 304 (implemented by mini-USB or Micro-USB, having an ID pin, a VBUS pin, a D+ pin, a D− pin and a GND pin) and a memory unit 306. In the accessory device 302, the resistance observed at the identification pin ID is Raccessory. Different accessory devices relate to different values of the resistance Raccessory. The memory unit 306 may be an EEPROM, storing operation parameters for the portable electronic device 100. The memory unit 306 may be read or written via the 1-wire communication via the identification pin (as shown in FIG. 3A).

Figure 3B:
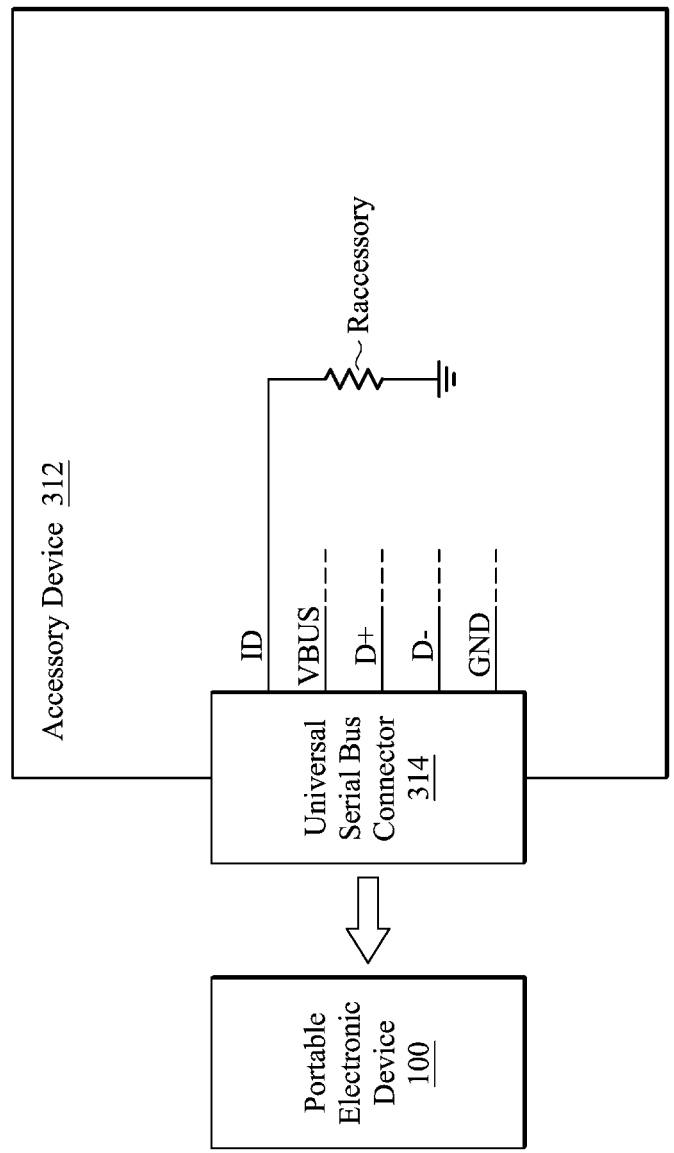
FIG. 3B depicts an accessory device 312 which does not support the 1-wire communication.

However, not all accessory devices for the portable electronic device 100 support the 1-wire communication. FIG. 3B shows an example of an accessory device incapable of the 1-wire communication. In comparison with that shown in FIG. 3A, the accessory device 312 shown in FIG. 3B does not support the 1-wire communication via the identification pin ID of the universal serial bus connector. The resistance observed at the identification pin ID is Raccessory. Different accessory devices have different resistance values Raccessory. The resistance Raccessory shown in FIG. 3A and FIG. 3B may be used by the detection and identification module, as discussed later with reference to FIG. 4.

Figure 4:
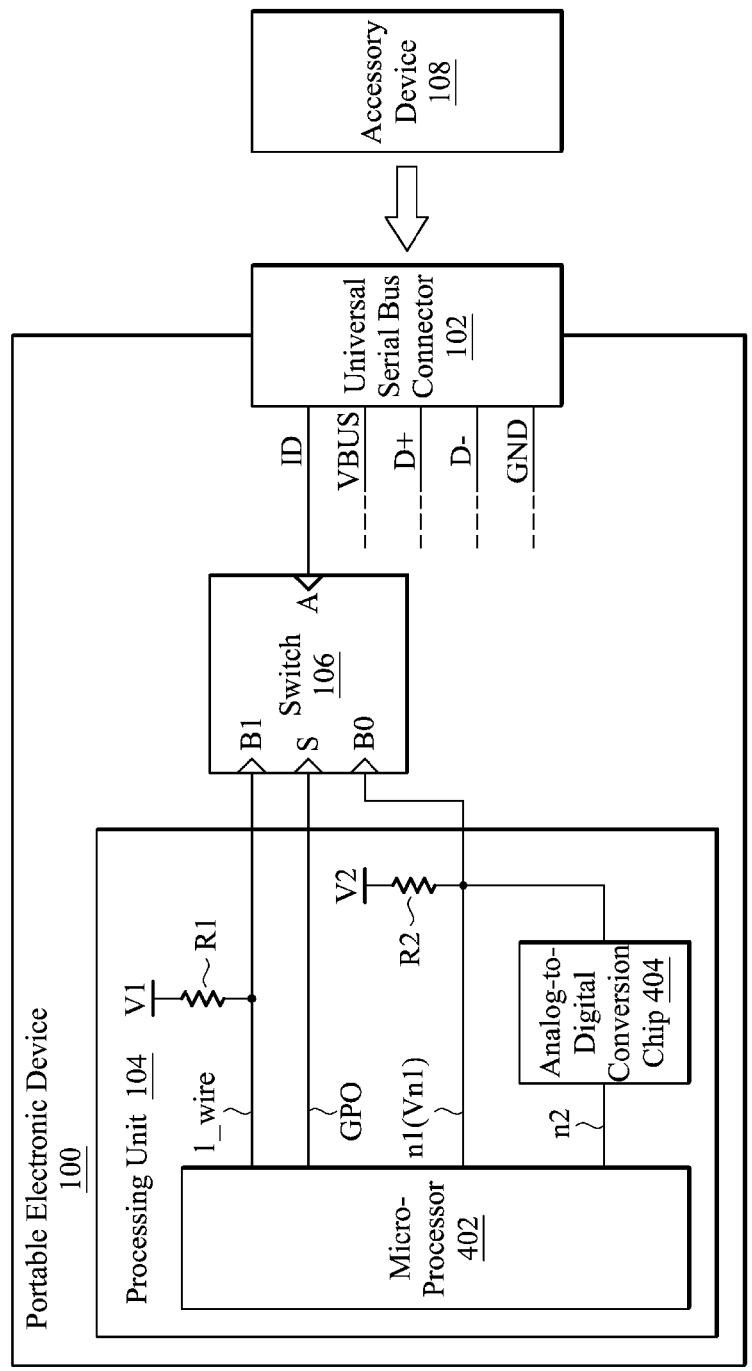
FIG. 4 depicts an exemplary embodiment of the portable electronic device 100.

FIG. 4 depicts an exemplary embodiment of the portable electronic device 100.

Referring to FIG. 4, the switch 106 has a connection terminal A at a first side, and connection terminals B0 and B1 at a second side, and has a control terminal S. Depending on a signal received by the control terminal S, the connection terminal A at the first side is connected to the connection terminal B0 or the connection terminal B1 at the second side. Further, in FIG. 4, the processing unit 104 includes a micro-processor 402, a first resistance component R1, a second resistance component R2 and an analog-to-digital conversion chip 404.

The switch control module 114 may be built in the micro-processor 402, and the micro-processor 402 may output the switch control signal CS through a general purpose output terminal (generally named GPO and is labeled GPO hereinafter.) The switch control signal CS output from the general purpose output terminal GPO is preset to control the switch 106 to connect the connection terminal A to the connection terminal B0. When it is determined that the accessory device 108 coupled to the portable electronic device 100 belongs to the accessory device type introduced in FIG. 3A, the micro-processor 402 switches the state of the switch control signal CS output from the general purpose output terminal GPO, and thereby the switch 106 is switched to connect the connection terminal A to the connection terminal B1.

Parts of the function blocks for the 1-wire communication may be built in the micro-processor 402, and the micro-processor 402 may provide a 1-wire communication pin 1_wire to be connected with the first resistance component R1 for implementation of the 1-wire communication module 112. As shown, one end of the first resistance component R1 is coupled to a first voltage level V1 while another end of the first resistance component R1 is connected with the 1-wire communication pin 1_wire, which is to be connected to the connection terminal B1 of the switch 106, for coupling to the identification pin ID that the connection terminal A is connected to. The micro-processor 402 may output a low voltage level at the 1-wire communication pin 1_wire as a low voltage signal used in the 1-wire communication, or, the micro-processor 402 may output no signal at the 1-wire communication pin 1_wire and thereby the first voltage level V1 that the first resistance component R1 couples to is used to implement a high level signal used in the 1-wire communication.

The micro-processor 402 may further include parts of function blocks of the detection and identification module 110 and may further provide a connection detecting pin n1 and a digital communication pin n2, in combination with the second resistance component R2 and the analog-to-digital conversion chip 404 to implement the detection and identification module 110. A first terminal of the second resistance component R2 and the connection detecting pin n1 are connected to the connection terminal B0 of the switch 106, for connecting to the identification pin ID that the connection terminal A is connected to. A second terminal of the second resistance component R2 is coupled to a second voltage level V2. In an exemplary embodiment, when a voltage level Vn1 at the connection detecting pin n1 (or, a voltage level at the first terminal of the second resistance component R2) deviates from the second voltage level V2 for at least a criterion voltage difference (e.g., $Vn1 < Vn2 \cdot Rmax/(R2+Rmax)$, where Rmax is an upper limit of the resistance Raccessory for all possible accessory devices,) the micro-processor 402 may determine that the universal serial bus connector 102 is coupled to an accessory device. The analog-to-digital conversion chip 404 works after the accessory device is detected, to look up a table according to a digital value of the voltage level $Vn1 (\approx V2 \cdot Raccessory/(R2+Raccessory))$, for identifying the accessory device 108. The table lookup mechanism is established based the different resistance Raccessory of the different accessory devices. The table lookup mechanism may be further used in determining whether the accessory device 108 coupled to the portable electronic device 100 belongs to the type of accessory device shown in FIG. 3A.

In other exemplary embodiments, the analog-to-digital conversion of the voltage level Vn1 may be built in the microprocessor 402. In this manner, the additional digital communication pin n2 for connecting to the analog-to-digital conversion chip 404 is not required when designing the microprocessor 402.

As for the disclosed operating method for a portable electronic device, it includes the following steps. An identification pin of a universal serial bus connector of the portable electronic device is used to detect and identify an accessory device that the universal serial bus connector is coupled to. Next, when it is determined that the accessory device supports 1-wire communication via the identification pin, the identification pin is used to communicate with the accessory device via the 1-wire communication.

Figure 5A:
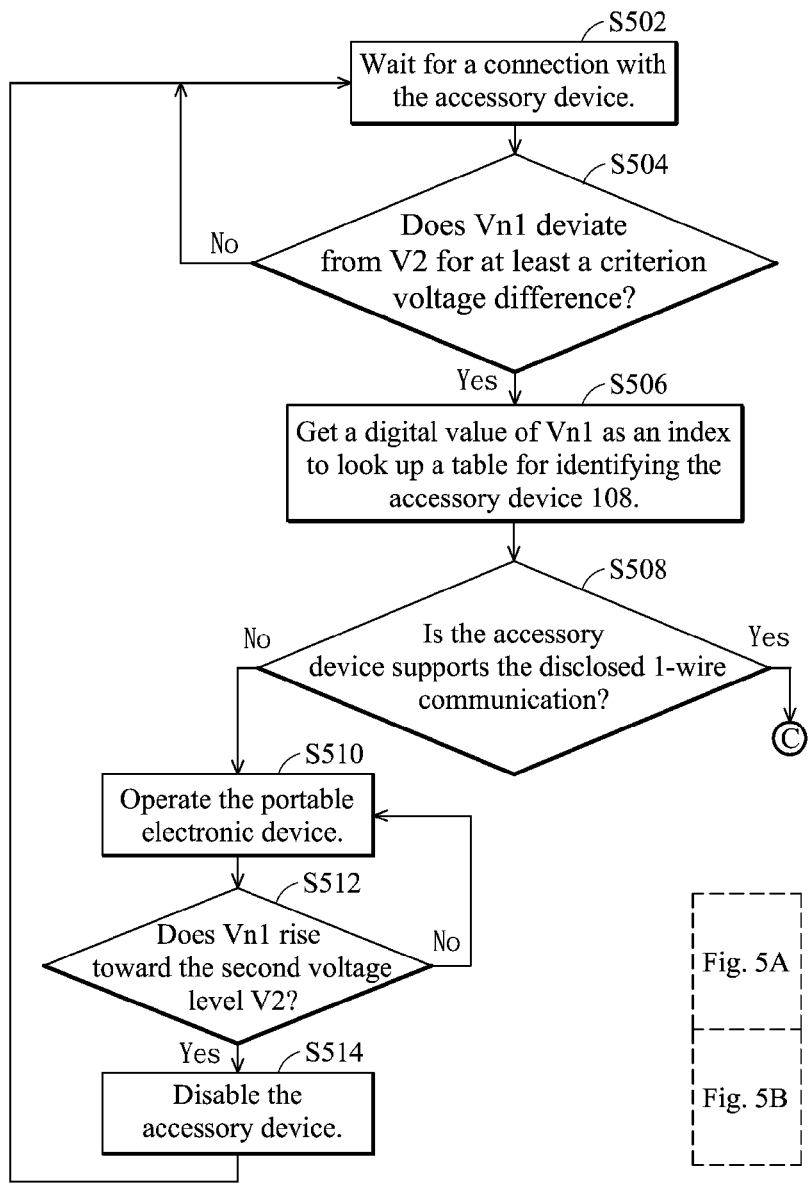
FIG. 5A and FIG. 5B show a flowchart, which depicts an operating method for a portable electronic device with reference to FIG. 4.
Figure 5B:
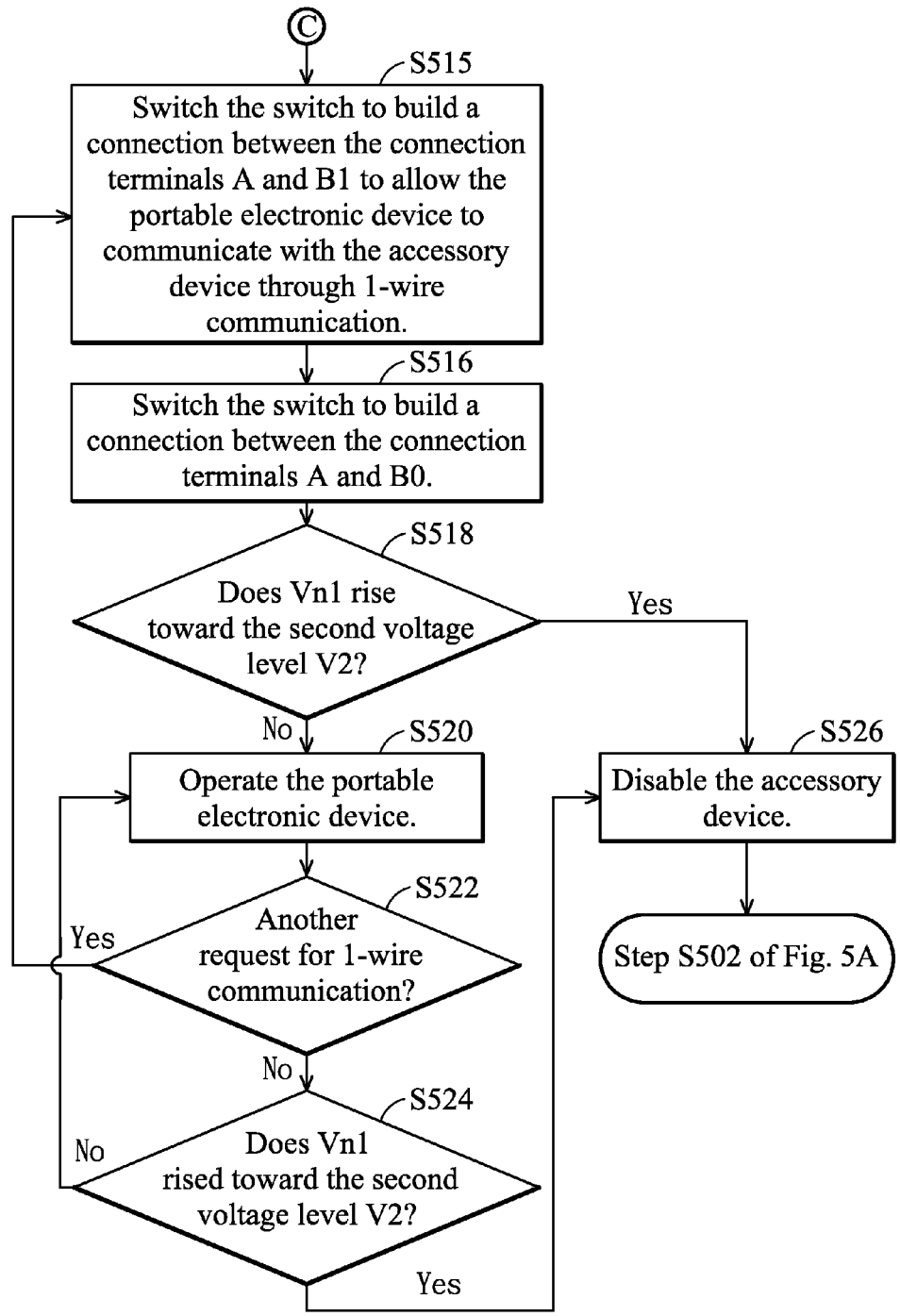

FIG. 5A and FIG. 5B show a flowchart illustrating an operating method for a portable electronic device with reference to FIG. 4. The micro-processor 402 may control the procedure and thereby the processing unit 104 of FIG. 4 may function as the function blocks 110~114 of the processing unit 104 of FIG. 1.

In step S502, the portable electronic device 100 waits for a connection with the accessory device 108. At this moment, the switch 106 connects the connection terminal A to the connection terminal B0. In step S504, a connection detection is performed, and, when the voltage level Vn1 deviates from the second voltage level V2 for at least a criterion voltage difference, it is determined that a connection is built between the portable electronic device 100 and the accessory device 108 and step S506 is performed. Otherwise, step S502 is performed.

In step S506, the digital value of the voltage level Vn1 is observed as an index for looking up a table and thereby to identify the accessory device 108. In step S508, it is determined, according to the table lookup, whether the accessory device 108 belongs to the type of accessory device shown in FIG. 3A. When the accessory device 108 does not belong to the type of accessory device shown in FIG. 3A and does not support the 1-wire communication of the disclosure, step S510 is performed and thereby the portable electronic device 100 operates the accessory device 108 according to the identification of the accessory device 108. In step S512, the value of the voltage level Vn1 is used in monitoring the connection between the accessory device 108 and the portable electronic device 100. When the voltage level Vn1 rises toward the second voltage level V2, it represents that the accessory device 108 has been disassembled from the portable electronic device 100 and step S514 is performed to disable the accessory device 108 and then step S502 is performed again. When it is determined in step S512 that the voltage level Vn1 has not been raised toward the second voltage level Vn2, the step S510 is continuously performed to operate the accessory device 108.

When it is determined in step S508 that the accessory device 108 belongs to the accessory device type shown in FIG. 3A and has the disclosed 1-wire communication function, the steps shown in FIG. 5B are performed (through point C). As shown in FIG. 5B, the step S515 is performed to switch the switch 106 to build a connection between the connection terminals A and B1 and the portable electronic device 100 starts to communicate with the accessory device 108 through 1-wire communication. After the 1-wire communication, the step S516 may be performed to switch the switch 106 back to build a connection between the connection terminals A and B0. In step S518, it is determined whether the voltage Vn1 has risen toward the second voltage level V2. When the voltage level Vn1 has not been raised toward the second voltage level V2, it represents that the connection between the portable electronic device 100 and the accessory device 108 has not been broken yet, and the step S520 is performed and thereby the portable electronic device 100 operates the accessory device 108 according to the identification (performed in step S506) of the accessory device 108 and the information collected during step S515. In step S522, it is monitored whether the 1-wire communication between the accessory device 108 and the portable electronic device 100 is requested again. For example, the user may request to amend the operation parameters stored in the memory unit (component 306 of FIG. 3A) of the accessory device 108. Once the portable electronic device 100 requests to communicate with the accessory device 108 via the 1-wire communication, step S515 of FIG. 5B is performed and the switch 106 is switched again. When no 1-wire communication request is detected in step S522, the connection between the portable electronic device 100 and the accessory device 108 is monitored (step S524). When it is determined in step S524 that the voltage level Vn1 has not been raised toward the second voltage level V2, the step S520 is performed to continuously operate the accessory device 108. When it is determined in step S524 that the voltage level Vn1 has risen toward the second voltage level V2, the accessory device 108 is regarded as being disassembled from the portable electronic device 100 and the step S526 is performed to disable the accessory device 108 and the step S502 of FIG. 5 is performed, to wait for insertion of an accessory device.

FIG. 5A and FIG. 5B show an operating method for a portable electronic device in accordance with an exemplary embodiment of the invention. But, it is not intended to limit the disclosure.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
a device body;
a universal serial bus connector, equipped on the device body for insertion of an accessory device to electronically connect the accessory device to the portable electronic device; and
a processing unit and a switch, wherein the switch, controlled by the processing unit, selectively couples an identification pin of the universal serial bus connector to different receiving terminals of the processing unit for different functions, and thereby the processing unit detects and identifies the accessory device via the identification pin of the universal serial bus connector and, when the accessory device supports 1-wire communication via the identification pin, the processing unit communicates with the accessory device via the 1-wire communication.

2. The portable electronic device as claimed in claim 1, wherein the processing unit reads a memory unit of the accessory device via the 1-wire communication and automatically operates the portable electronic device to switch to a specific mode in accordance with information read out from the memory unit.

3. The portable electronic device as claimed in claim 2, wherein the processing unit further amends the information stored in the memory unit via the 1-wire communication.

4. The portable electronic device as claimed in claim 2, wherein the processing unit comprises:
- a micro-processor, having a 1-wire communication pin which is coupled to the identification pin of the universal serial bus connector by the switch to communicate with the accessory device via the 1-wire communication; and
- a first resistance component, coupling the 1-wire communication pin to a first voltage level and thereby generating a high voltage level signal used in the 1-wire communication.

5. The portable electronic device as claimed in claim 4, wherein:
- the micro-processor further has a connection detecting pin which is coupled to the identification pin of the universal serial bus connector by the switch;
- the processing unit further comprises a second resistance component coupling the connection detecting pin to a second voltage level; and
- the switch is preset to couple the connection detecting pin to the identification pin of the universal serial bus connector and the micro-processor detects a connection from the accessory device based on whether a voltage level of the connection detecting pin deviates from the second voltage level for at least a criterion voltage difference.

6. The portable electronic device as claimed in claim 5, wherein the micro-processor looks up a table according to a digital value of an analog signal at the connection detecting pin to identify whether the accessory device supports the 1-wire communication via the identification pin and, when the accessory device supports the 1-wire communication via the identification pin, the micro-processor switches the switch to couple the 1-wire communication pin to the identification pin of the universal-serial bus connector.

7. The portable electronic device as claimed in claim 5, wherein:
- the micro-processor further comprises a digital communication pin;
- the processing unit further comprises an analog-to-digital conversion chip, converting an analog signal at the connection detecting pin to a digital value to be conveyed to the micro-processor via the digital communication pin; and
- the micro-processor looks up a table according to the digital value received by the digital communication pin to identify whether the accessory device supports the 1-wire communication via the identification pin, and, the micro-processor switches the switch to couple the 1-wire communication pin to the identification pin of the universal serial bus connector when the accessory device supports the 1-wire communication via the identification pin.

8. An accessory device supporting 1-wire communication with a portable electronic device, comprising:
- a memory unit, storing operation parameters for the portable electronic device; and
- a universal serial bus connector, connecting to the portable electronic device, wherein:
- an identification pin of the universal serial bus connector is utilized by the portable electronic device to detect and identify the accessory device and to perform 1-wire communication with the accessory device after identifying the accessory device, and thereby the operation parameters stored in the memory unit are provided to the portable electronic device,
- the operation parameters stored in the memory unit relate to one specific mode of the portable electronic device, and the operation parameters are consulted to automatically switch the portable electronic device to the specific mode, and
- the operation parameters stored in the memory unit are amended by the portable electronic device via the identification pin of the universal serial bus connector.

9. An operating method for a portable electronic device, comprising:
- using an identification pin of a universal serial bus connector of a portable electronic device to detect and identify an accessory device connected to the universal serial bus connector;
- communicating with the accessory device by 1-wire communication via the identification pin when it is identified that the accessory device supports the 1-wire communication via the identification pin;
- reading a memory unit of the accessory device via the 1-wire communication;
- automatically switching the portable electronic device to a specific mode based on operation parameters read out from the memory unit; and
- amending the operation parameters stored in the memory unit via the 1-wire communication.

* * * * *